United States Patent
Lee et al.

(10) Patent No.: US 11,897,365 B2
(45) Date of Patent: Feb. 13, 2024

(54) SYSTEM FOR CONTROLLING ELECTRIC POWER OF FUEL CELL VEHICLE AND METHOD THEREFOR

(71) Applicants: Hyundai Motor Company, Seoul (KR); Kia Motors Corporation, Seoul (KR)

(72) Inventors: Seung Yoon Lee, Seoul (KR); Byoung Hoon Choi, Gyeonggi-do (KR); Jeong Kyu Park, Gyeonggi-do (KR); Jae Hoon Jeong, Seoul (KR); Sae Byeok Seung, Gyeonggi-do (KR); Hyo Jun Kim, Gyeonggi-Do (KR); Dong Hoon Kim, Seoul (KR); Sang Chul Yeom, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 736 days.

(21) Appl. No.: 17/034,590

(22) Filed: Sep. 28, 2020

(65) Prior Publication Data
US 2021/0387545 A1  Dec. 16, 2021

(30) Foreign Application Priority Data
Jun. 11, 2020  (KR) .................. 10-2020-0070925

(51) Int. Cl.
| | |
|---|---|
| *B60L 58/40* | (2019.01) |
| *B60L 58/12* | (2019.01) |
| *B60L 15/20* | (2006.01) |
| *B60W 40/107* | (2012.01) |

(Continued)

(52) U.S. Cl.
CPC ............ *B60L 58/40* (2019.02); *B60L 15/20* (2013.01); *B60L 58/12* (2019.02); *B60W 40/076* (2013.01); *B60W 40/107* (2013.01); *B60L 50/75* (2019.02); *B60L 2240/54* (2013.01); *B60L 2240/64* (2013.01)

(58) Field of Classification Search
CPC ......... B60L 58/40; B60L 15/20; B60L 58/12; B60L 50/75; B60L 2240/54; B60L 2240/64; B60W 40/076; B60W 40/107
USPC ........................................................ 701/22
See application file for complete search history.

(56) References Cited

U.S. PATENT DOCUMENTS

| | | | | |
|---|---|---|---|---|
| 2010/0305799 A1* | 12/2010 | Yamada | ............... | B60W 10/26 180/65.265 |
| 2011/0196545 A1* | 8/2011 | Miwa | ................. | H02J 7/0047 700/292 |

(Continued)

FOREIGN PATENT DOCUMENTS

| | | |
|---|---|---|
| KR | 20100060478 A | 6/2010 |
| KR | 10-1459464 B1 | 11/2014 |
| KR | 10-2019-0051143 A | 5/2019 |

*Primary Examiner* — Jacob S. Scott
*Assistant Examiner* — Michael E Butler
(74) *Attorney, Agent, or Firm* — Fox Rothschild LLP

(57) ABSTRACT

A system for controlling electric power of a vehicle having a fuel cell is provided. The system includes a fuel cell that generates electric energy by receiving fuel and oxidizing gas and a battery that receives the electric energy of the fuel cell to charge or discharge the battery for supplying the electric energy. A sensor sense a driving state of the vehicle. A controller controls charging or discharging of the battery based on the driving state sensed by the sensor.

10 Claims, 4 Drawing Sheets

(51) Int. Cl.
   *B60W 40/076*   (2012.01)
   *B60L 50/75*    (2019.01)

(56)         References Cited

U.S. PATENT DOCUMENTS

2014/0336860 A1* 11/2014  Saitoh ................. B60L 15/2018
                                                          701/22
2017/0144647 A1*  5/2017  Gutruf ................. B60W 20/00
2018/0375135 A1* 12/2018  Kumada ........... H01M 8/04201
2019/0135264 A1*  5/2019  Shin ...................... B60W 20/40
2019/0241174 A1*  8/2019  Ito ............................. B60L 7/14
2019/0381894 A1* 12/2019  Kujubu ............... B60L 15/2018
2020/0391615 A1* 12/2020  Beck ................... H01M 16/006

* cited by examiner

SYSTEM FOR CONTROLLING ELECTRIC POWER OF FUEL CELL VEHICLE AND METHOD THEREFOR

CROSS REFERENCE TO RELATED APPLICATION

The present application claims priority of Korean Patent Application No. 10-2020-0070925 filed on Jun. 11, 2020, the entire contents of which is incorporated herein for all purposes by this reference.

TECHNICAL FIELD

The present disclosure relates to a system for controlling electric power of a vehicle having a fuel cell and a method for, and more specifically, to a strategy for charging and discharging a high-voltage battery according to a gradient of a road on which the vehicle drives.

BACKGROUND

A fuel cell is a type of generation device that directly converts chemical energy generated by oxidation of a fuel into electric energy. The fuel cell is the same with a chemical cell generally in terms of using oxidation and reduction reaction, and yet the fuel cell has a difference in that a reactant is continuously supplied from the outside and a reaction product is continuously removed out of the system, unlike the chemical cell performing a cell reaction in a closed system. Recently, fuel cell generation systems have been put to practical use, and since reaction products of fuel cells are pure water, a research has been actively conducted to be used as energy sources of environmental-friendly vehicles.

A fuel cell system includes a fuel cell stack for generating electrical energy through a chemical reaction, an air supply device for supplying air to a cathode of the fuel cell stack, and a hydrogen supply device for supplying hydrogen to an anode of the fuel cell stack. In other words, oxygen-containing air is supplied to the cathode of the fuel cell stack, and hydrogen is supplied to the anode of the fuel cell stack.

In addition, the fuel cell system further includes a high-voltage battery storing electric energy generated by the fuel cell stack. The high-voltage battery is charged with the electric energy generated by the fuel cell stack and electric energy recovered through a driving motor, and supplies the electric energy to assist the fuel cell stack while being discharged.

The fuel cell stack enters a fuel cell (FC) stop mode in which power generation is stopped when electric energy generation is not required, and air supplied to the fuel cell stack is blocked in the FC stop mode. In particular, the case where the electric energy generation of the fuel cell stack is not required includes stopping the vehicle, driving with discharge energy of a high-voltage battery, and recovering regenerative braking energy during downhill driving or decelerating.

In other words, to sufficiently assist the electric energy of the fuel cell stack and maximally sustain the FC stop for stopping the electric energy generation to secure the durability of the fuel cell stack, the maximum rechargeable amount of the high-voltage battery of a fuel cell vehicle should be increased, but accordingly the weight and costs increase.

The above-described background arts are merely for enhancing understanding of the background of the present disclosure, and it should not be taken as a person having ordinary skill in the art to know that they correspond to a conventional art.

SUMMARY

The present disclosure provides technology of efficiently using a battery by sensing a driving state of a vehicle and adjusting the state of charge of the battery according to the driving state of the vehicle.

One aspect of the present disclosure provides a system for controlling electric power of a vehicle having a fuel cell that may include: a fuel cell configured to generate electric energy by receiving fuel and oxidizing gas; a battery configured to receive the electric energy of the fuel cell, such that the battery is charged or discharged for supplying the electric energy; a sensor configured to sense a driving state of the vehicle; and a controller configured to adjust charging or discharging of the battery based on the driving state sensed by the sensor.

The sensor may be configured to sense a gradient of a road on which the vehicle drives or the inclination of the vehicle. The sensor may be configured to sense that the vehicle performs uphill driving when the gradient of the road or the inclination of the vehicle is equal to or greater than a predetermined first reference value. Additionally, the sensor may be configured to sense that the vehicle performs downhill driving when the gradient of the road or the inclination of the vehicle is equal to or less than a predetermined second reference value.

The sensor may be configured to sense that the vehicle performs uphill driving when the gradient of the road or the inclination of the vehicle remains equal to or greater than the predetermined first reference value for a predetermined reference time or more. The sensor may be configured to sense that the vehicle performs downhill driving when the gradient of the road or the inclination of the vehicle remains equal to or less than the predetermined second reference value for the predetermined reference time or more. In addition, the sensor may be configured to sense the gradient of the road on which the vehicle drives based on an atmospheric pressure sensed by the vehicle or sense the inclination of a vehicle based on an acceleration of the vehicle sensed by the vehicle.

The controller may be configured to set a target state of charge of the battery based on the sensed driving state and adjust charging or discharging of the battery to correspond to the set target state of charge. The controller may be configured to increase the target state of charge when the sensor determines that the vehicle performs uphill driving. The controller may be configured to decrease the target state of charge when the sensor determines that the vehicle performs downhill driving.

Additionally, the controller may be configured to continuously increase or decrease the target state of charge when the sensor senses that the vehicle continuously performs uphill driving or downhill driving in a state where the sensor senses that the vehicle performs the uphill driving or the downhill driving. The controller may be configured to set the target state of charge to a predetermined state of charge when the sensor determines that the vehicle performs flat-ground driving. The controller may be configured to operate the battery to be charged when a current state of charge of the battery is less than the target state of charge, and operate the battery to be discharged when the current state of charge of the battery exceeds the target state of charge. The controller may be configured to control generation of the fuel cell to be stopped or continued based on the state of charge of the battery.

Another aspect of the present disclosure provides a method for controlling electric power of a vehicle having a fuel cell that may include: sensing a driving state of the vehicle; setting a target state of charge of a battery based on the sensed driving state; and charging or discharging of the battery based on the set target state of charge.

The sensing of the driving state of the vehicle may include: sensing a gradient of a road on which the vehicle drives or an inclination of the vehicle. The setting of the target state of charge of the battery may include: increasing the target state of charge in response to determining that the driving state of the vehicle is uphill driving. The setting of the target state of charge of the battery may include decreasing the target state of charge in response to determining that the driving state of the vehicle is downhill driving.

Additionally, the setting of the target state of charge of the battery may include continuously increasing or decreasing the target state of charge when it is sensed that the vehicle continuously performs uphill driving or downhill driving. According to a system for controlling power of a fuel cell vehicle and a method thereof of the present disclosure, the state of charge of a battery may be increased or decreased by the charging or discharging of the battery based on the driving state of a fuel cell vehicle, and the battery may be efficiently used. In other words, the battery may be efficiently used by increasing or decreasing the state of charge of the battery within the limited maximum state of charge of the battery as needed. In addition, fuel efficiency may be increased while improving the durability of the fuel cell by reducing the frequency of entering or releasing the stopping of the fuel cell generation.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Figure 1:
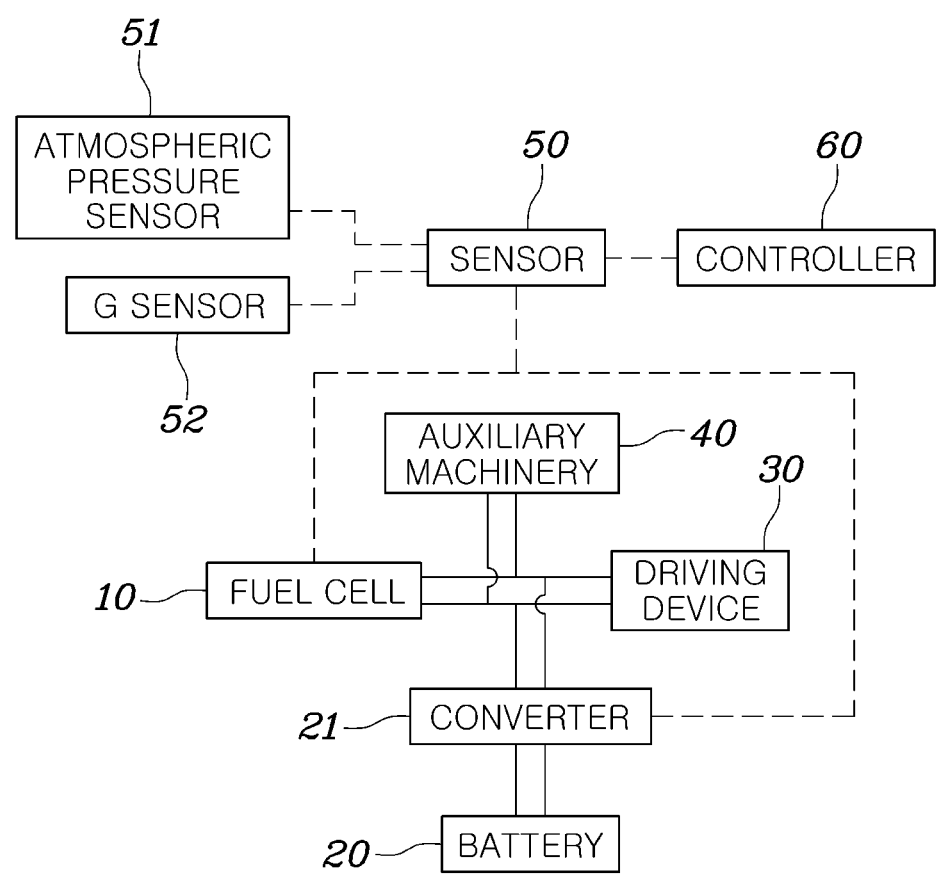
FIG. 1 is a block diagram illustrating a power control system of a vehicle having a fuel cell vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Specific structural or functional descriptions of the exemplary embodiments of the present disclosure disclosed in the present specification or application are exemplified only for the purpose of describing the exemplary embodiments of the present disclosure, and the exemplary embodiments of the present disclosure may be implemented in various forms and should not be interpreted as being limited to the exemplary embodiments described in the present specification or application.

Since the exemplary embodiments of the present disclosure can be modified variously and have various forms, specific exemplary embodiments will be illustrated in the drawings and described in detail in the present specification or application. However, it should be understood that the exemplary embodiments according to a concept of the present disclosure are not limited to specific disclosed form, but including all changes, equivalents, or replacements included in the spirit and technical scope of the present disclosure.

It will be understood that although the terms "first," "second," etc. may be used herein to describe various elements, these elements should not be limited by these terms. The terms are used only to distinguish one element from another element, for example, without departing from the scope of rights of the concept of the present disclosure, the first element may be referred to as a second element, and similarly the second element may be referred to as a first element.

When it is mentioned that an element is "coupled" or "connected" to another element, it should be understood that the element may be directly coupled or connected to the other element, or another element may exist therebetween. On the other hand, when it is mentioned that an element is "directly coupled" or "directly connected" to another element, it should be understood that there is no other element therebetween. Other expressions describing the relationship between the elements, that is, "between" and "directly between" or "adjacent to" and "directly adjacent to" should be interpreted as well.

The terms used in the present specification are used only to describe specific exemplary embodiments, and are not intended to limit the present disclosure. As used herein, the singular forms "a," "an," and "the" are intended to include the plural forms as well, unless the context clearly indicates otherwise. In the present specification, it should be understood that terms "include" or "comprise" are intended to indicate that a stated feature, a number, a step, an operation, an element, a part, or a combination thereof exists, but not to exclude in advance the existence or addition of one or more other features, numbers, steps, operations, elements, parts, or combinations thereof.

Unless otherwise defined, all terms used herein, including technical or scientific terms, have the same meaning as those generally understood by those skilled in the art. The terms defined in the commonly used dictionary should be interpreted to have the same meaning as the meaning in the context of the related art, and should not be interpreted as an ideal or excessively formal meaning unless clearly defined in the present specification.

Hereinafter, exemplary embodiments of the present disclosure will be described in detail with reference to the accompanying drawings. Like reference numerals denote like elements in the each drawing.

FIG. 1 is a block diagram illustrating a power control system of a vehicle having a fuel cell 10 according to an exemplary embodiment of the present disclosure. Referring to FIG. 1, a system for controlling electric power of a vehicle having a fuel cell 10 according to an exemplary embodiment of the present disclosure may include: a fuel cell 10 that receives fuel and oxidizing gas and generates electric energy; a battery 20 that receives the electric energy of the fuel cell 10 to be charged or discharged to supply the electric energy; a sensor 50 configured to sense a driving state of a vehicle; and a controller 60 configured to adjust charging or discharging of the battery 20 based on the driving state sensed by the sensor 50.

The sensor 50 and the controller 60 according to an exemplary embodiment of the present disclosure may be implemented through a non-volatile memory (not shown) configured to store data on an algorithm configured to control operations of various components of the vehicle or software instructions for reproducing the algorithm, and a processor (not shown) configured to perform operations described below using the data stored in the memory. In particular, the memory and the processor may be implemented as individual chips. Alternatively, the memory and the processor may be implemented as a single chip integrated with each other. The processor may take one or more types of processors.

The fuel cell 10 may be a fuel cell stack 10 that receives hydrogen and oxygen-containing air as fuel through an anode and a cathode, respectively, and generates electric power through a chemical reaction. In particular, the fuel cell 10 may have a plurality of unit cells stacked therein, wherein fuel and air are introduced into each unit cell to generate electric power, and the fuel cell 10 may output high-voltage electric power by the unit cells connected in series.

The battery 20 may be electrically connected to the fuel cell 10, a driving device 30, and an auxiliary machinery 40. As an exemplary embodiment, the fuel cell 10 may be connected in series to the driving device 30 and the auxiliary machinery 40 through a main bus terminal, and the battery 20 may be connected in parallel to the main bus terminal. The battery 20 may be connected to the fuel cell 10 with a converter 21 interposed therebetween, and the converter 21 may be a bidirectional high-voltage direct current/direct current (DC/DC) converter (BHDC) configured to convert power in a direction in which the battery 20 is charged or in a direction in which the battery 20 is discharged.

The controller 60 may be configured to operate the high-voltage converter 21 to control charging or discharging of the battery 20. In particular, the controller 60 may be a battery management system (BMS) configured to adjust charging or discharging of the battery 20. The sensor 50 may be configured to operate sense a driving state of the fuel cell 10 vehicle. In particular, the sensor 50 may be configured to operate sense flat-ground driving, uphill driving, or downhill driving of the vehicle having the fuel cell 10, as will be described below.

In another exemplary embodiment, the sensor 50 may be configured to operate sense the stop, low-speed driving, high-speed driving, or corner driving of the vehicle having the fuel cell 10. The controller 60 may be configured to operate adjust charging or discharging of the battery 20 based on the driving state sensed by the sensor 50. In other words, the controller 60 may be configured to operate increase a state of charge (SOC) of the battery 20 or decrease the SOC of the battery 20 and efficiently use the battery 20 by adjusting the charging or discharging of the battery 20 based on the driving state of the fuel cell 10 vehicle.

Therefore, according to the present application, the battery (20) may be efficiently used by increasing or decreasing the SOC of the battery (20) within the limited maximum SOC of the battery (20) as needed. In particular, the sensor 50 may be configured to operate sense the gradient of a road on which the vehicle drives or the inclination of the vehicle. In other words, the sensor 50 may be configured to operate determine the gradient of a road to determine a driving state of the vehicle driving while being grounded to the road, and may be configured to operate directly sense the inclination of the vehicle to determine the driving state of the vehicle.

As an exemplary embodiment, the sensor 50 may be configured to operate sense the gradient of a road on which the vehicle is being driven based on atmospheric pressure sensed by the vehicle. An atmospheric pressure sensor 51 configured to measure an atmospheric pressure outside the vehicle may be mounted in the vehicle, and the sensor 50 may be configured to operate sense an altitude of a road on which the vehicle is being driven based on the atmospheric pressure sensed by the atmospheric pressure sensor 51, and may determine uphill driving, downhill driving, or flat-ground driving of the vehicle by sensing a change in the altitude.

In another exemplary embodiment, the sensor 50 may be configured to operate directly sense the change in atmospheric pressure sensed by the atmospheric pressure sensor 51 to determine the uphill driving, the downhill driving, or the flat-ground driving of the vehicle. As another exemplary embodiment, the sensor 50 may be configured to operate sense the inclination of the vehicle based on the acceleration of the vehicle sensed by the vehicle. The vehicle may include a G sensor 52 configured to sense acceleration of gravity or a gyro sensor for sensing yaw, roll, and pitch. The sensor 50 may be configured to operate determine the inclination of the vehicle using the acceleration of the vehicle sensed by the G sensor 52 or the gyro sensor.

In another exemplary embodiment, the gradient of a road on which the vehicle is being driven may be sensed using global positioning system (GPS) information and navigation information. In particular, the gradient of a road on which a vehicle is expected to drive may be sensed in advance using the navigation information. The sensor 50 may be configured to operate sense that the vehicle performs uphill driving when the gradient of the road or the inclination of the vehicle is equal to or greater than a predetermined first reference value and may be configured to operate sense that the vehicle performs downhill driving when the gradient of the road or the inclination of the vehicle is equal to or less than a predetermined second reference value.

The uphill driving may refer to a driving state of the vehicle on an uphill road, and the downhill driving may refer to a driving state of the vehicle on a downhill road. In particular, the first reference value may be preset to a gradient greater than 0 at which the driving force required for driving the vehicle is increased by a predetermined level, and the second reference value may be preset to a gradient less than 0 at which the driving force required for driving the vehicle is decreased by a predetermined level. In addition, the sensor 50 may be configured to operate sense that the vehicle performs uphill driving or downhill driving when the gradient of a road or the inclination of a vehicle is equal to or greater than a predetermined first reference value or is equal to or less than a predetermined second reference value and remains for the predetermined reference time T1 or more.

In particular, the sensor 50 may be configured to operate sense that the vehicle performs uphill driving when the gradient of a road or the inclination of a vehicle is equal to or greater than the predetermined first reference value and remains on the uphill road for the predetermined reference time T1 or more. In addition, the sensor 50 may be configured to operate sense that the vehicle performs downhill driving when the gradient of a road or the inclination of a vehicle is equal to or less than the predetermined second reference value and remains on the downhill road for the predetermined reference time T1 or more. In addition, when the gradient of a road or the inclination of a vehicle is less than the predetermined first reference value and more than the predetermined second reference value, the sensor 50 may be configured to operate sense that the vehicle performs the flat-ground driving.

Figure 2:
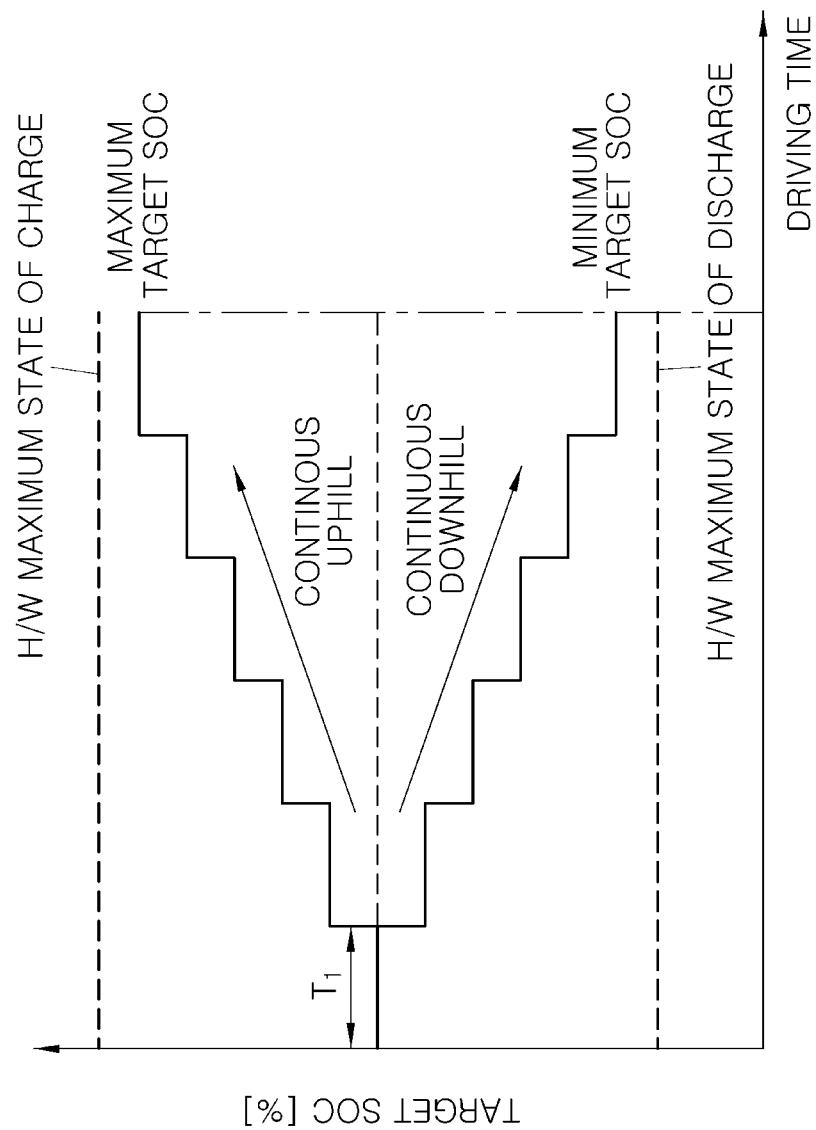
FIG. 2 is a view illustrating a target state of charge according to a duration of uphill or downhill driving according to an exemplary embodiment of the present disclosure.
Figure 3:
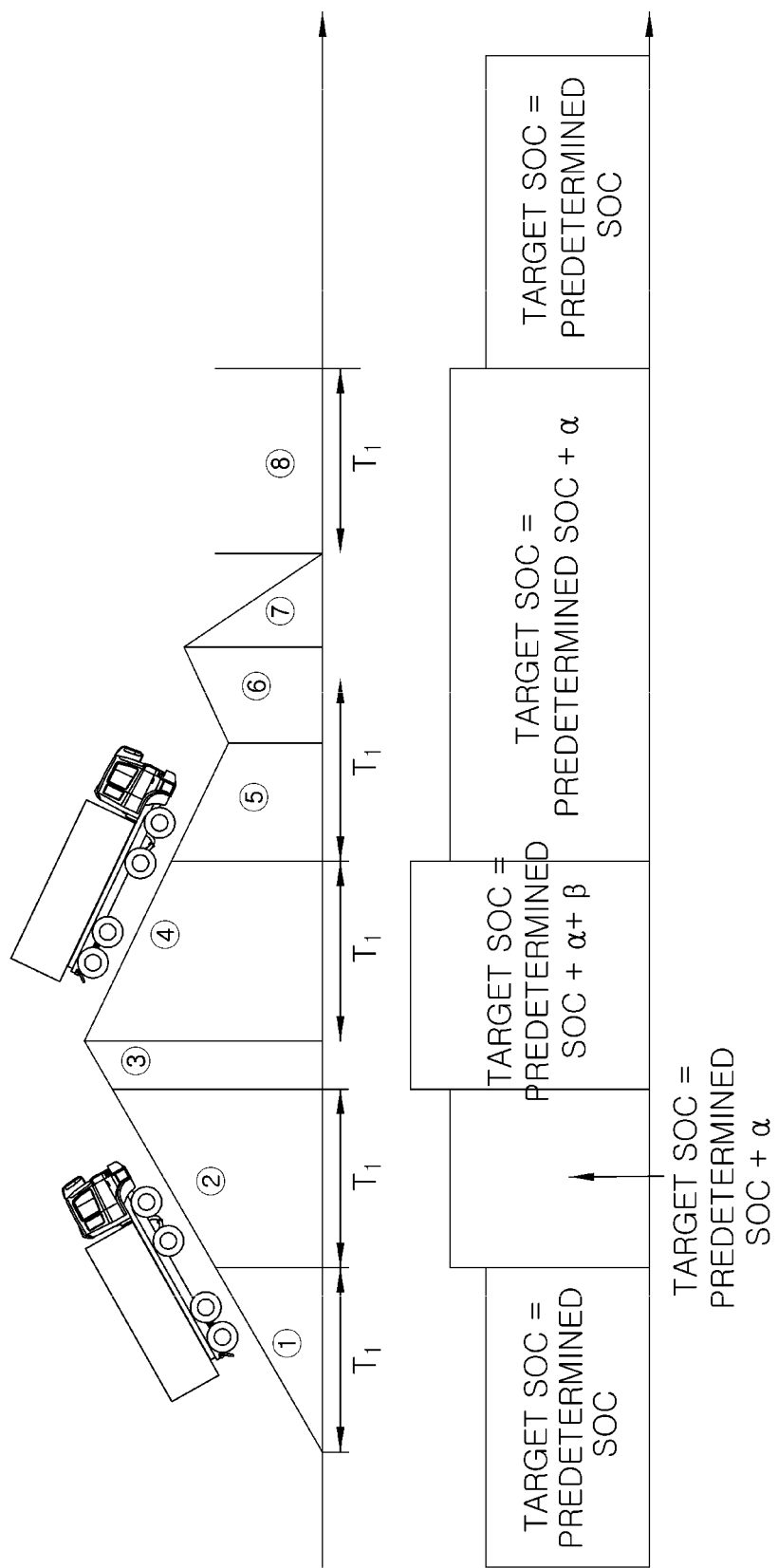
FIG. 3 is a view illustrating a target state of charge during driving of a vehicle according to an exemplary embodiment of the present disclosure.

FIG. 2 is a view of illustrating a target state of charge according to a duration of uphill driving or downhill driving according to an exemplary embodiment of the present disclosure, and FIG. 3 is a view of illustrating a target state of charge during driving of a vehicle according to an exemplary embodiment of the present disclosure. Referring to FIGS. 2 and 3, the controller 60 may be configured to operate set a target state of charge of the battery 20 based on the sensed driving state, and adjust charging or discharging of the battery 20 to correspond to the set target state of charge.

According to the related art, the target state of charge of the battery 20 may be set as a predetermined state of charge based on the performance of the battery 20. According to the present application, the controller 60 may be configured to operate set a target state of charge of the battery 20 based on the driving state sensed by the sensor 50. In addition, the controller 60 may be configured to operate adjust charging or discharging of the battery 20 to correspond the target state of charge. In particular, the controller 60 may be configured to operate the battery 20 to be charged when the current state of charge of the battery 20 is less than the target state of charge, and operate the battery 20 to be discharged when the current state of charge of the battery 20 is greater than the target state of charge.

In particular, the controller 60 may be configured to operate charge the battery 20 with electric energy generated by the fuel cell 10 or charge the battery 20 with electric energy recovered by regenerative braking from the driving device 30 or the auxiliary machinery 40. On the other hand, the controller 60 may be configured to operate discharge the battery 20 by driving the driving device 30 or the auxiliary machinery 40, thereby reducing the power generated by the fuel cell 10. The controller 60 may be configured to operate increase the target state of charge when the sensor 50 determines that the vehicle performs uphill driving.

In particular, the controller 60 may be configured to operate increase the target state of charge greater than before in response to determining that the vehicle performs uphill driving. As an exemplary embodiment, the increased state of charge greater than the predetermined state of charge may be set as the target state of charge in response to determining that the vehicle performs uphill driving. The controller 60 may be configured to operate decrease the target state of charge when the sensor 50 determines that the vehicle performs downhill driving. As an exemplary embodiment, the decreased state of charge less than the predetermined state of charge may be set as the target state of charge in response to determining that the vehicle performs downhill driving. The controller 60 may be configured to operate continuously increase or decrease the target state of charge when the sensor 50 senses that the vehicle continuously performs uphill driving or downhill driving while the sensor 50 senses that the vehicle performs the uphill driving or the downhill driving.

As shown in FIG. 2, the sensor 50 may be configured to operate sense the uphill driving or the downhill driving when the gradient of a road or the inclination of a vehicle remains on such a road for the predetermined reference time T1 or more, and the controller 60 may be configured to operate increase or decrease the target state of charge. In addition, when the sensor 50 senses that the gradient of a road or the inclination of a vehicle is maintained for the predetermined reference time T1 or more in the state in which the sensor 50 senses that the vehicle performs uphill driving or downhill driving, the controller 60 may be configured to operate continuously increase or decrease the target state of charge.

In particular, the controller 60 may be configured to operate continuously increase or decrease the target state of charge, or increase or decrease the target state of charge in each predetermined step. However, the controller 60 may be configured to operate set the target state of charge to be less than or equal to a predetermined maximum state of charge (H/W maximum state of charge) and greater than or equal to a predetermined minimum state of charge (H/W maximum state of discharge).

In an exemplary embodiment, the controller 60 may be configured to operate set the target state of charge to the predetermined state of charge when the sensor 50 determines that the vehicle performs a flat-ground driving. In other words, the controller 60 may be configured to operate restore the target state of charge to the predetermined state of charge when the sensor 50 determines that the vehicle performs a flat-ground driving. In particular, referring to FIG. 3, the controller 60 may be configured to operate initially set the target state of charge to the predetermined state of charge.

The controller 60 may be configured to operate increase (+α) the target state of charge when the uphill driving condition (e.g., the gradient of a road or the inclination of a vehicle is equal to or greater than the predetermined first reference value and is maintained for the predetermined reference time T1 or more) is satisfied (①). The controller 60 may be configured to operate further increase (+β) the target state of charge when the uphill driving condition (e.g., the gradient of a road or the inclination of a vehicle is equal to or greater than the predetermined first reference value and is maintained for the predetermined reference time T1 or more) is satisfied again in the state in which the sensor 50 senses that the vehicle performs the uphill driving (②).

The controller 60 may be configured to operate maintain the target state of charge without further increasing when the vehicle does not continuously perform uphill driving for the predetermined reference time T1 or more even though the vehicle continuously performs the uphill driving at the predetermined first reference value or more (③). The controller 60 may be configured to operate decrease (−β) the target state of charge when the downhill driving condition (e.g., the gradient of a road or the inclination of a vehicle is equal to or less than the predetermined second reference value and remains for the predetermined reference time T1 or more) is satisfied (④).

The controller 60 may be configured to operate maintain the target state of charge without further decreasing when the vehicle does not continuously perform downhill driving for the predetermined reference time T1 or more even though the vehicle continuously performs the downhill driving at the predetermined second reference value or less in the state where the sensor 50 senses that the vehicle performs the downhill driving (⑤). The controller 60 may be configured to operate maintain the target state of charge without further increasing when the vehicle does not continuously perform uphill driving for the predetermined reference time T1 or more even though the vehicle performs the uphill driving at the predetermined first reference value or more in the downhill driving state (⑥).

Additionally, the controller 60 may be configured to operate maintain the target state of charge without further decreasing when the vehicle does not continuously perform downhill driving for the predetermined reference time T1 or more even though the vehicle continuously performs the downhill driving at the predetermined second reference value or less in the downhill driving state (⑦). When the sensor 50 senses that the vehicle performs flat-ground driving, the controller 60 may be configured to operate restore the target state of charge to the predetermined state of charge (⑧).

Further, the controller 60 may be configured to operate control the generation of the fuel cell 10 to be stopped or continued based on the state of charge of the battery 20. In particular, the controller 60 may be configured to operate control the generation of the fuel cell 10 according to whether the state of charge of the battery 20 is equal to or greater than a target state of charge or less than a target state of charge. In addition, the controller 60 may be configured to operate control generation of the fuel cell 10 based on electric power required by the driving device 30 and the auxiliary machinery 40.

In an exemplary embodiment, the controller 60 may be configured to operate stop the generation of the fuel cell 10 when the charging state of the battery 20 is equal to or greater than the target state of charge, and the required electric power of the driving device 30 and the auxiliary machinery 40 is equal to or less than the predetermined electric power (e.g. FC stop mode). On the other hand, the controller 60 may be configured to operate resume the generation of the fuel cell 10 when the charging state of the battery 20 is less than the target state of charge or the required power required by the driving device 30 and the auxiliary machinery 40 is equal to or greater than predetermined power.

Therefore, the controller 60 may be configured to operate increase the target state of charge to reduce the FC stop mode of the fuel cell 10, thereby continuously maintaining the power generation. In particular, when vehicle performs uphill driving, the driving device 30 may require power greater than the power generated by the fuel cell 10, and accordingly, the generation of the fuel cell 10 may be continued so that the generation of the fuel cell 10 is not unnecessarily stopped.

In addition, the controller 60 may be configured to operate increase the stop of the generation of the fuel cell 10 by decreasing the target state of charge. In particular, when the vehicle performs downhill driving, the required power of the driving device 30 may be decreased and the electric energy recovered by the regenerative braking may be increased, thus improving the durability of the fuel cell 10 and improving fuel efficiency while the FC stop mode is maintained by rapidly stopping the generation of the fuel cell 10. In other words, according to the present disclosure, the frequency of entering or releasing the stop of generation of the fuel cell 10 may be reduced, thereby improving the durability of the fuel cell 10 and increasing fuel efficiency.

Figure 4:
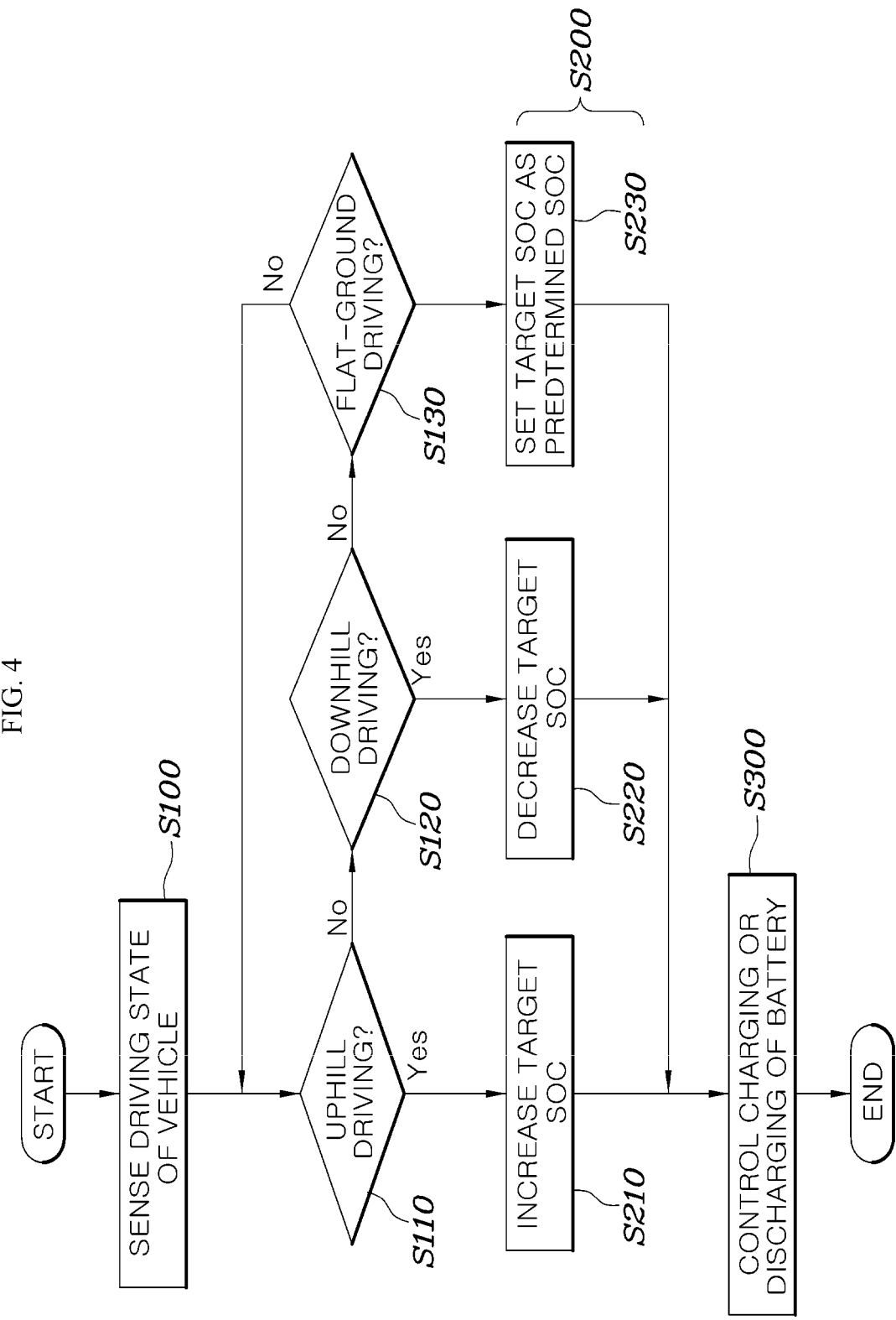
FIG. 4 is a flowchart illustrating a method for controlling power of a fuel cell vehicle according to an exemplary embodiment of the present disclosure.

FIG. 4 is a flowchart illustrating a method for controlling power of a fuel cell 10 vehicle according to an exemplary embodiment of the present disclosure. The method described herein below may be executed by the controller. Referring to FIG. 4, the method for controlling power of a fuel cell 10 vehicle according to the exemplary embodiment of the present disclosure may include: sensing a driving state of a vehicle (S100); setting a target state of charge of a battery 20 based on the sensed driving state (S200); and controlling charging or discharging of the battery 20 based on the set target state of charge (S300).

In the step S100 of sensing the driving state of the vehicle, the inclination of a vehicle or the gradient of a road on which the vehicle is being driven may be sensed. In the step S200 of setting the target state of charge of the battery 20, in response to determining that the driving state of a vehicle is the uphill driving S110, the target state of charge may be increased (S210). In the step S200 of setting the target state of charge of the battery 20, in response to determining that the driving state of a vehicle is the downhill driving S120, the target state of charge may be decreased (S220).

In the step S200 of setting the target state of charge of the battery 20, in response to determining that the driving state of a vehicle is the flat-ground driving S130, the target state of charge may be set as a predetermined state of charge (S230). In the step S200 of setting the target state of charge of the battery 20, when it is sensed that the vehicle continuously performs the uphill driving or the downhill driving while it is sensed that the vehicle performs the uphill driving or the downhill driving S110 and S120, the target state of charge may be continuously increased or decreased (S210 and S220).

While one or more exemplary embodiments have been described with reference to the figures, it will be understood by those of ordinary skill in the art that various changes in form and details may be made therein without departing from the spirit and scope as defined by the following claims.

What is claimed is:

1. A system for controlling electric power of a vehicle having a fuel cell, comprising:
   a fuel cell configured to generate electric energy by receiving fuel and oxidizing gas;
   a battery configured to receive the electric energy of the fuel cell to charge or discharge the battery for supplying the electric energy;
   a sensor configured to sense a driving state of the vehicle; and
   a controller configured to control charging or discharging of the battery based on the driving state sensed by the sensor;
   wherein the controller is configured to set a target state of charge of the battery based on the sensed driving state and control charging or discharging of the battery to correspond to the set target state of charge; and
   wherein the controller is configured to continuously increase or decrease the target state of charge in response to the sensor sensing that the vehicle continuously performs uphill driving or downhill driving.

2. The system of claim 1, wherein the sensor is configured to sense a gradient of a road on which the vehicle is being driven or the inclination of the vehicle.

3. The system of claim 2, wherein:
   the sensor is configured to sense that the vehicle performs uphill driving when the gradient of the road or the inclination of the vehicle is equal to or greater than a predetermined first reference value, and
   the sensor is configured to sense that the vehicle performs downhill driving when the gradient of the road or the inclination of the vehicle is equal to or less than a predetermined second reference value.

4. The system of claim 3, wherein:
   the sensor is configured to sense that the vehicle performs uphill driving when the gradient of the road or the inclination of the vehicle is maintained equal to or greater than the predetermined first reference value for a predetermined reference time or more, and
   the sensor is configured to sense that the vehicle performs downhill driving when the gradient of the road or the inclination of the vehicle is maintained equal to or less than the predetermined second reference value for the predetermined reference time or more.

5. The system of claim 2, wherein the sensor is configured to sense the gradient of the road on which the vehicle drives based on an atmospheric pressure sensed by the vehicle or sense the inclination of a vehicle based on an acceleration of the vehicle sensed by the vehicle.

6. The system of claim 1, wherein the controller is configured to increase the target state of charge in response to the sensor determining that the vehicle performs uphill driving.

7. The system of claim 1, wherein the controller is configured to decrease the target state of charge in response to the sensor determining that the vehicle performs downhill driving.

8. The system of claim 1, wherein the controller is configured to set the target state of charge to a predetermined state of charge in response to the sensor determining that the vehicle performs flat-ground driving.

9. The system of claim 1, wherein the controller is configured to charge the battery in response to determining that a current state of charge of the battery is less than the target state of charge, and discharge the battery in response to determining that the current state of charge of the battery exceeds the target state of charge.

10. The system of claim 1, wherein the controller is configured to control generation of the fuel cell to be stopped or continued based on the state of charge of the battery.

* * * * *